United States Patent
Lamb

(10) Patent No.: US 8,281,829 B2
(45) Date of Patent: Oct. 9, 2012

(54) OFF-ROAD TIRE TREAD HAVING STRAKE AND CHAMFER STRUCTURE

(75) Inventor: Matthew Lamb, Waxhaw, NC (US)

(73) Assignee: Continental Tire The Americas LLC, Fort Mill, SC (US)

(*) Notice: Subject to any disclaimer, the term of this patent is extended or adjusted under 35 U.S.C. 154(b) by 897 days.

(21) Appl. No.: 12/285,845

(22) Filed: Oct. 15, 2008

(65) Prior Publication Data

US 2009/0107599 A1 Apr. 30, 2009

Related U.S. Application Data

(60) Provisional application No. 61/000,432, filed on Oct. 25, 2007.

(51) Int. Cl.
  *B60C 11/00* (2006.01)
  *B60C 11/03* (2006.01)
(52) U.S. Cl. ............. 152/209.18; 152/209.1; 152/209.2; 152/209.8; 152/209.15; 152/902; 152/903
(58) Field of Classification Search .............. 152/209.1, 152/209.2, 209.8, 209.15, 209.18, 902, 903; D12/578, 579, 600
See application file for complete search history.

(56) References Cited

U.S. PATENT DOCUMENTS

| | | | |
|---|---|---|---|
| 4,545,415 A * | 10/1985 | Lindner et al. | 152/209.1 |
| 5,109,903 A | 5/1992 | Watanabe et al. | |
| 5,293,918 A * | 3/1994 | Tsuda et al. | 152/209.8 |
| 6,250,353 B1 * | 6/2001 | Maxwell | 152/209.15 |
| 6,531,012 B2 * | 3/2003 | Ishiyama | 156/110.1 |

FOREIGN PATENT DOCUMENTS

| | | | |
|---|---|---|---|
| EP | 1336510 A | | 8/2003 |
| JP | 06143935 A | * | 5/1994 |
| JP | 2002316516 A | | 10/2002 |

OTHER PUBLICATIONS

PCT Search Report & Written Opinion in corresponding PCT/US2008/012023.

* cited by examiner

*Primary Examiner* — Khanh P Nguyen
*Assistant Examiner* — Carson Gross
(74) *Attorney, Agent, or Firm* — Greenblum & Bernstein, P.L.C.

(57) ABSTRACT

A pneumatic tire (10) has an inner shoulder (11), an outer shoulder (12) and a tread (13) therebetween. The tread has a central axis (A) and includes a plurality of first grooves (14). Each first groove has a first end (15) disposed near the outer shoulder and a second end (17) disposed near the inner shoulder so that each first groove crosses the central axis. The first end is spaced circumferentially from the second end. A plurality of second grooves (16) is provided with each second groove connecting the second end of a first groove to a first end of another first groove. The first and second grooves define a cascading repetition of tread blocks (18). Chamfers (20) are defined on certain corners of the tread blocks that are adjacent to the first grooves.

12 Claims, 2 Drawing Sheets

OFF-ROAD TIRE TREAD HAVING STRAKE AND CHAMFER STRUCTURE

This application claims the benefit of the earlier filing date of U.S. Provisional Application No. 61/000,432, filed on Oct. 25, 2007, which is incorporated by reference herein in its entirety.

FIELD

The present invention relates to a tire tread and, more particularly, to a tire tread having exceptional traction for off-road surfaces.

BACKGROUND

Tire treads for off road use need to have excellent traction while maintaining lateral vehicle stability during turning maneuvers.

Tires for off-road use require exceptional traction while maintaining lateral stability. A typical, conventional off-road tire tread employs a repeating pattern of long, intermediate length and short tread blocks arranged to provide improved traction. Although this type of tread provides adequate traction, there is a need to provide a tire tread with even better traction while maintaining lateral stability.

SUMMARY

An object of the invention is to fulfill the need referred to above. In accordance with the principles of the disclosed embodiments, this objective is obtained by providing a pneumatic tire having an inner shoulder, an outer shoulder and a tread therebetween. The tread has a central axis and includes a plurality of first grooves. Each first groove has a first end disposed near the outer shoulder and a second end disposed near the inner shoulder so that each first groove crosses the central axis. The first end is spaced circumferentially from the second end. A plurality of second grooves is provided with each second groove connecting the second end of a first groove to a first end of another first groove. The first and second grooves define a cascading repetition of tread blocks. Chamfers are defined on certain corners of the tread blocks that are adjacent to the first grooves.

In accordance with another aspect of the disclosed embodiments, a pneumatic tire has an inner shoulder, an outer shoulder, and a tread therebetween. The tread has a central axis and includes a plurality of first grooves. Each first groove is of trans-toric shape and has a first end disposed near the outer shoulder and a second end disposed near the inner shoulder so that each first groove crosses the central axis. The first end is spaced circumferentially from the second end. A plurality of second grooves is provided with each second groove connecting the second end of a first groove to a first end of another first groove. The first and second grooves define a cascading repetition of tread blocks. Chamfers are defined on certain corners of the tread blocks that are adjacent to the first grooves.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
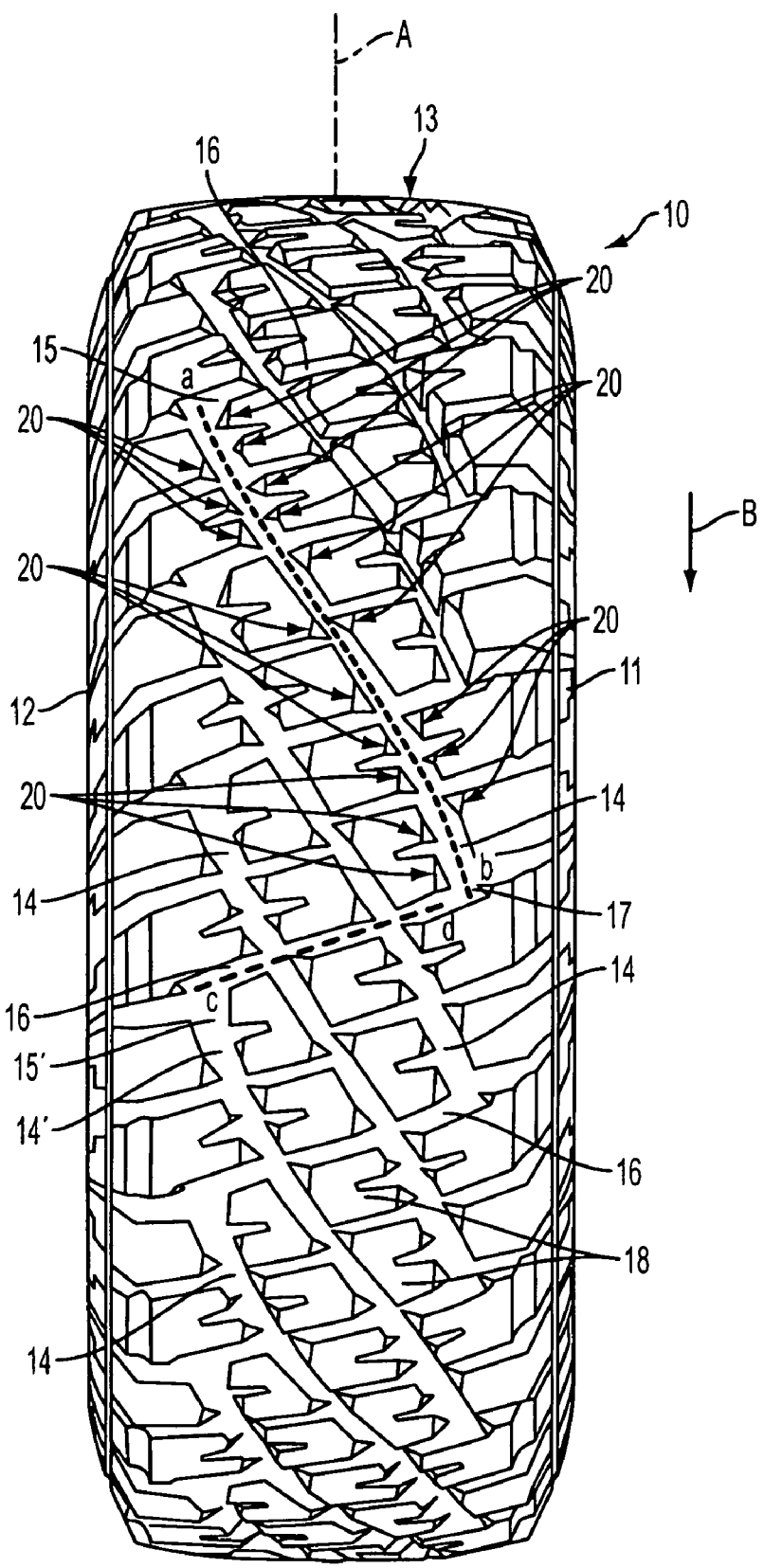
FIG. 1 shows a tire according to an embodiment from a radial direction.
Figure 2:
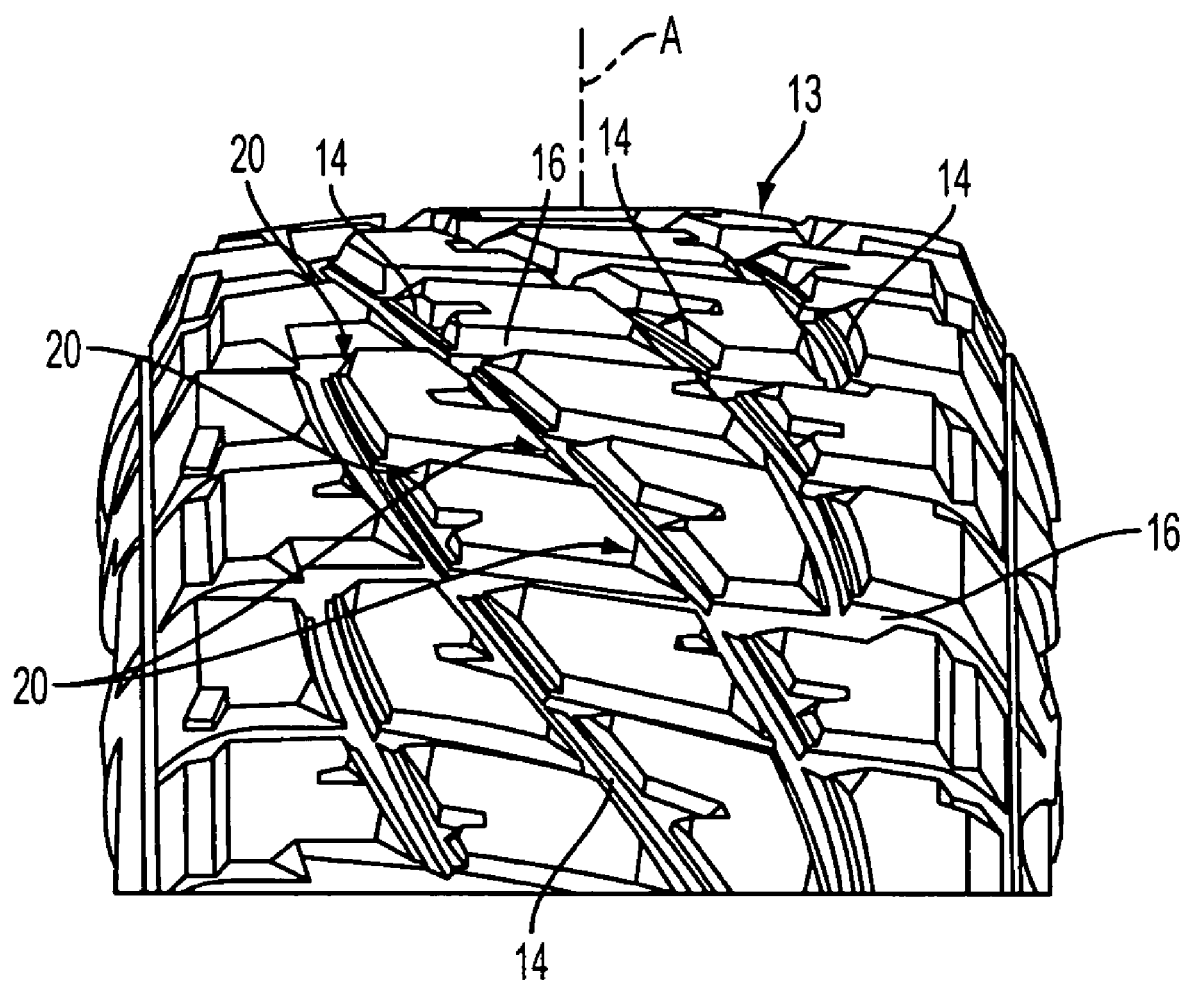
FIG. 2 shows a portion of the tire of FIG. 1.

With reference to FIGS. 1 and 2, pneumatic tire, generally shown at 10, is formed from inner shoulder 11, outer shoulder wall 12, and a tread, generally indicated at 13, extending therebetween. In this context, "inner" and "outer" are used merely for ease of description, it being understood that tire 10 can be mounted on a vehicle so that either inner shoulder 11 or outer shoulder 12 faces the vehicle's interior.

Referring to FIG. 1, the tread 13 is composed of a plurality of "strake" or a first grooves 14. As best seen in FIG. 2, each first groove 14 is generally curved and, more particularly, or of a trans-toric shape. A groove 14 is indicted by dashed line a-b in FIG. 1 and is repeated around the circumference of the tire 10. Thus, each groove 14 crosses central tire axis A, with a first end 15 disposed near outer side wall 12 and a second end 17 disposed near inner side wall 11. The first end 15 being spaced circumferentially (in the direction of arrow B in FIG. 1) from the second end 17. Each first groove 14 is not lateral or circumferential; rather it transits the torus of the tire at an angle that creates repeating rows of tread blocks, as will be explained below.

Each groove 14 is intersected by a lateral, second groove 16 as indicated by line c-d that connects the second end 17 to the first end 15 of the next groove 14. As shown in FIGS. 1 and 2, each second groove 16 passed through two first grooves 14. Thus, a pair of grooves 16 connected with a groove 14 defines a generally backward Z-shape in the tread 13. This repeating groove structure creates a cascading repetition of tread blocks 18.

The tread blocks 18 include chamfers, generally indicated at 20, defined on corners thereof adjacent to the first grooves 14 and on each side of each first groove 14. More particularly, the chamfers 20 are on tread block corners that that expose the following tread block wall to the off-road or contact surface, thereby providing extreme traction from the rotating tire 10 to the vehicle. In other words, the chamfers 20 open the tread block edges and faces to meet the off-road surfaces, thus providing added traction. The generally triangularly shaped chamfers 20 also counteract any drift resulting from the cascading tread block arrangement, thus maintaining a high degree of lateral stability.

The strake and chamfer structure of the tread 13 provides exceptional traction for off-road surfaces and thus can be used for off-road competition, and can be developed for the replacement tire market.

Despite its asymmetrical appearance, a tire 10 with this tread 13 has symmetrical properties so that it is not necessary to provide mirror-image tires on the two sides of the vehicle. The tire tread 13 will maintain lateral stability of a vehicle equipped with identical tires on the right and left side.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A pneumatic tire having an inner shoulder, an outer shoulder and a tread therebetween, the tread having a central axis and comprising:
   a plurality of first grooves, each having a first end disposed near the outer shoulder and a second end disposed near the inner shoulder so that each first groove is generally curved and crosses the central axis, the first end being spaced circumferentially from the second end,
   a plurality of second grooves, each connecting the second end of a first groove to a first end of another first groove, the first and second grooves defining a cascading repetition of tread blocks, and
   chamfers defined on certain corners of the tread blocks that are adjacent to the first grooves,
   wherein a circumferential spacing between the first end and the second end of each first groove is greater than a circumferential spacing between first and second ends of the second grooves connecting the first groove and the another first groove.

2. The tire of claim 1, wherein the each second groove passes through two first grooves.

3. The tire of claim 1, wherein the certain corners are corners that structured and arranged to expose a following tread block wall, relative to a rotation of the tire, to a contact surface to improve off-road traction.

4. The tire of claim 1, wherein each chamfer is generally triangularly shaped.

5. The tire of claim 1, wherein the tread blocks having the certain corners are on each side of each first groove.

6. The tire of claim 1, wherein each first groove has two curvatures facing different directions.

7. The tire of claim 5, wherein each first groove is of toric shape across a torus of the tire.

8. The tire of claim 1, wherein each first groove is arranged across a torus of the tire.

9. A pneumatic off-road tire having an inner shoulder, an outer shoulder and a tread therebetween, the tread having a central axis and comprising:
   a plurality of generally curved first grooves, each first groove having a first end disposed near the outer shoulder and a second end disposed near the inner shoulder so that each first groove crosses the central axis, the first end being spaced circumferentially from the second end,
   a plurality of second grooves, each connecting the second end of a first groove to a first end of another first groove, the first and second grooves defining a cascading repetition of tread blocks, and
   chamfers defined on certain corners of the tread blocks that are adjacent to the first grooves and that expose a tread block wall following the chamfer, relative to a rotation of the tire, to an off-road contact surface,
   wherein a circumferential spacing between the first end and the second end of each first groove is greater than a circumferential spacing of ends of the second grooves connecting the second end of the first groove to the first end of the another first groove.

10. The tire of claim 1, wherein at least some of the tread blocks include more than two chamfers.

11. The tire of claim 1, wherein a plurality of tread blocks have a plurality of chamfers arranged along a same first groove.

12. An off-road tire having an inner shoulder, an outer shoulder and a tread therebetween, the tread having a central axis and comprising:
   a plurality of first grooves, each first groove having two curvatures oriented in different direction and having a first end disposed near the outer shoulder and a second end disposed near the inner shoulder so that each first groove crosses the central axis, the first end being spaced circumferentially from the second end,
   a plurality of second grooves, each connecting the second end of a first groove to a first end of another first groove and passing through two other first grooves, thereby defining cascading repetition of tread blocks, and
   chamfers defined on certain corners of the tread blocks that are adjacent to the first grooves and that expose a tread block wall following the chamfer, relative to a rotation of the tire, to an off-road contact surface,
   wherein at least some of the tread blocks include a plurality of chamfers arranged so that at least two of the plurality of chamfers are located along a same first groove,
   wherein a circumferential spacing between the first end and the second end of each first groove is greater than a circumferential spacing of ends of the second grooves connecting the second end of the first groove to the first end of the another first groove.

* * * * *